United States Patent
Takahashi

(10) Patent No.: US 7,832,195 B2
(45) Date of Patent: Nov. 16, 2010

(54) CONTROL DEVICE AND CONTROL METHOD FOR SPARK-IGNITED INTERNAL-COMBUSTION ENGINE

(75) Inventor: Tomohiko Takahashi, Isehara (JP)

(73) Assignee: Nissan Motor Co., Ltd., Yokohama (JP)

( * ) Notice: Subject to any disclaimer, the term of this patent is extended or adjusted under 35 U.S.C. 154(b) by 813 days.

(21) Appl. No.: 11/821,705

(22) Filed: Jun. 25, 2007

(65) Prior Publication Data

US 2007/0295305 A1  Dec. 27, 2007

(30) Foreign Application Priority Data

Jun. 26, 2006  (JP) ............... 2006-174789

(51) Int. Cl.
- *F01N 3/00* (2006.01)
- *F01N 3/10* (2006.01)
- *F02B 27/04* (2006.01)

(52) U.S. Cl. .............. 60/284; 60/273; 60/285; 60/300

(58) Field of Classification Search ............ 60/273, 60/284, 285, 300
See application file for complete search history.

(56) References Cited

U.S. PATENT DOCUMENTS

2004/0163378 A1 * 8/2004 Sasaki et al. ............ 60/284

FOREIGN PATENT DOCUMENTS

| JP | 2000179362 A | * | 6/2000 |
| JP | 2004270504 | | 9/2004 |
| JP | 2005214039 | | 8/2005 |

* cited by examiner

*Primary Examiner*—Thomas E Denion
*Assistant Examiner*—Audrey Klasterka
(74) *Attorney, Agent, or Firm*—Global IP Counselors, LLP

(57) ABSTRACT

Super retard combustion is performed in which an ignition timing is set to be after a compression top dead center and fuel is injected before the ignition timing and after the compression top dead center, at cold start or the like which requires early warming-up of a catalyst. During an idle operation without the super retard combustion, a first ISC control is executed in which a feedback control is provided for the degree of opening of a throttle and the ignition timing so that an engine speed corresponds to a target idle speed (S14). On the other hand, during the super retard combustion, a second ISC control is executed in which the control of the degree of opening of the throttle is inhibited, but the ignition timing is advanced because a catalyst may be thermally damaged when the amount of intake air is increased in accordance with an increase in load of an auxiliary device and the like (S15).

15 Claims, 6 Drawing Sheets

CONTROL DEVICE AND CONTROL METHOD FOR SPARK-IGNITED INTERNAL-COMBUSTION ENGINE

CROSS-REFERENCES TO RELATED APPLICATION

This application claims priority from Japanese Patent Application Serial No. 2006-174789 filed Jun. 26, 2006, which is hereby incorporated by reference.

BACKGROUND

The technology relates to a spark-ignited internal-combustion engine having a fuel-injection valve that directly injects fuel in a cylinder, and an ignition plug that ignites a mixture of fuel and air in the cylinder with a spark. In particular, the technology relates to an idle speed control at cold start, which requires early warming-up of a catalytic converter in an exhaust system.

As disclosed in Japanese Unexamined Patent Application Publication No. 2004-270504, during an idle operation of an internal-combustion engine, an idle speed control (hereinafter, referred to as ISC control) is executed to provide a feedback control for the degree of opening of a throttle which adjusts an amount of intake air so that an engine speed corresponds to a target idle speed.

Also, Japanese Unexamined Patent Application Publication No. 2005-214039, assigned to the assignee of the present application, discloses a catalyst warm-up method for the spark-ignited internal-combustion engine of in-cylinder direct-injection type including the steps of, when the early warming-up of the catalyst is requested, setting the ignition timing to be at compression top dead center (TDC) or later, and setting the fuel-injection timing at the TDC or later and immediately before the ignition timing, for performing super retard combustion.

The above-described super retard combustion is a technique for increasing the exhaust temperature due to combustion in an exhaust path by retarding the ignition timing to be the TDC or later so as to decrease the combustion rate and the combustion efficiency. In the super retard combustion, the degree of opening of the throttle is relatively increased in the idle operation to compensate for the decrease in torque caused by the decrease in the combustion efficiency, as compared with normal combustion in which the fuel-injection timing and the ignition timing are before the compression top dead center.

While in super retard combustion the exhaust temperature is extremely high, but it can be further elevated if the amount of fuel injection and the amount of intake air are increased in accordance with the increase in load of an auxiliary device and the like such that the combustion quantity is further increased. Therefore, the temperature of the catalytic converter may become excessively high, causing thermal damage and thermal degradation.

SUMMARY OF THE INVENTION

In the light of the above-mentioned circumstances, it is desirable to perform an idle operation stably and reliably in a spark-ignited internal-combustion engine using a fuel injection mechanism (e.g., an in-cylinder direct-injection type or a multi-point injection (MPI)), which also performs super retard combustion.

A control device for a spark-ignited internal-combustion engine adjusts a degree of opening of a throttle means such as a throttle valve of a throttle, a fuel-injection of a fuel-injection means such as a fuel-injection valve directly provided in a cylinder or a multi-point injection, and an ignition timing of an ignition means such as an ignition plug or the like so as to control combustion of the internal-combustion engine. The throttle valve is provided at a suction path and regulates an amount of intake air applied to a combustion chamber. A first idle speed control allows the degree of opening of the throttle valve and the ignition timing to be adjusted, and provides a feedback control such that an engine speed corresponds to a target speed.

In an operation mode that requires warming-up of a catalyst provided in an exhaust path for purification of exhaust gas, for example, at cold start of the internal-combustion engine, a catalyst warm-up unit sets the fuel-injection timing and the ignition timing to be after a compression top dead center (TDC) by way of super retard combustion so as to increase an exhaust temperature.

In the case where the fuel-injection timing and the ignition timing are set to be after the compression top dead center to increase the exhaust temperature for the purpose of the warming-up of the catalyst, if the amount of fuel injection and the amount of intake air are increased, e.g., by the first idle speed control, in accordance with the increase in load of the auxiliary device and the like, the combustion quantity of the internal-combustion engine may be further increased. As a result, the exhaust temperature to be further increased. Further, the additional increase in the combustion quantity during the super retard combustion may undesirably cause damage to the catalyst.

Accordingly, when the fuel-injection timing and the ignition timing are set to be after the compression top dead center by the catalyst warm-up unit, a second idle speed control locks the control of the degree of opening of the throttle valve intending the feedback control such that the engine speed corresponds to the target speed, but advances the ignition timing to provide the feedback control such that the engine speed corresponds to the target speed.

Thus, to give a solution for the decrease in the engine speed during the super retard combustion, the control of the degree of opening of the throttle valve intending the feedback control such that the engine speed corresponds to the target speed is locked, and the torque is increased only by adjusting the ignition timing, to restore the engine speed to the target speed. Accordingly, the increase in combustion quantity and thermal degradation may be suppressed.

Moreover, we note that, in the super retard combustion, the torque sensitivity is relatively high as compared with the case where the ignition timing is advanced at the first idle speed control because the ignition timing has already been retarded markedly. Therefore, to give the solution for the decrease in the speed due to the load of the auxiliary device and the like, the speed may be restored immediately to the target speed only by the advancement of the ignition timing.

DETAILED DESCRIPTION

Figure 1:
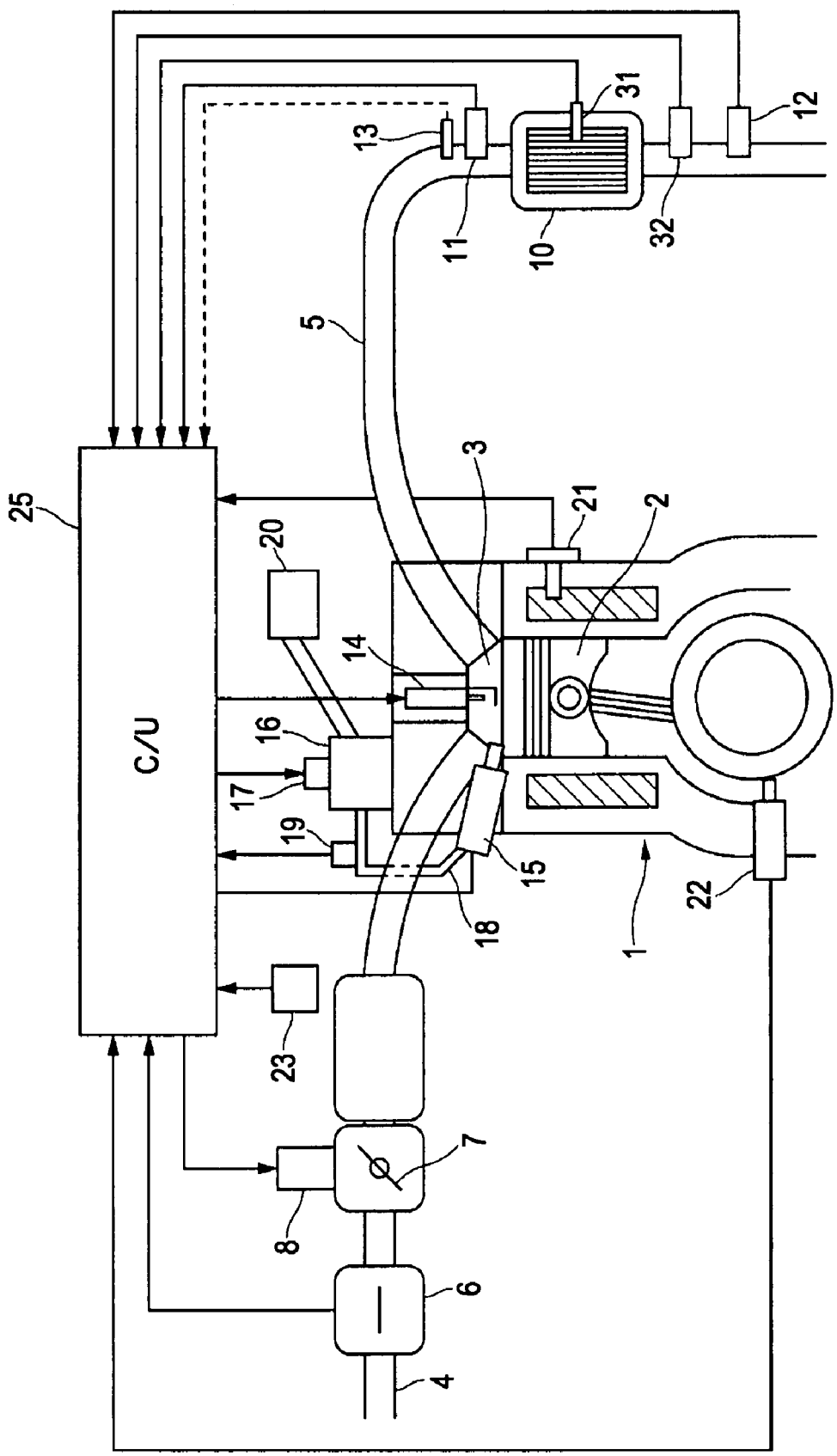
FIG. 1 is an explanatory view showing an exemplary entire system configuration of an internal-combustion engine.

While the claims are not limited to the illustrated embodiments, an appreciation of various aspects of the apparatus or method is best gained through a discussion of various examples thereof. Referring now to the drawings, illustrative embodiments are shown in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limiting or restricting to the precise form and configuration shown in the drawings and disclosed in the following detailed description. Exemplary embodiments of the present invention are described in detail by referring to the drawings as follows.

FIG. 1 is an illustration showing an exemplary system configuration of a spark-ignited internal-combustion engine of in-cylinder direct-injection type. While such an engine type is shown, other approaches will also work such as one involving multi-point injection (MPI), where the fuel is injected through each intake port. An internal-combustion engine 1 has a combustion chamber 3 which is defined by a cylinder, a cylinder head, and a piston 2. The combustion chamber 3 is connected to a suction path 4 with a suction valve (not shown) interposed therebetween, and to an exhaust path 5 with an exhaust valve (not shown) interposed therebetween. The suction path 4 is provided with an airflow meter 6 for detecting an amount of intake air, and a throttle having an adjustment mechanism such as an electronically controlled throttle valve 7, the degree of opening thereof being controlled with a control signal provided via an actuator 8. The exhaust path 5 is provided with a catalytic converter 10 for purification of exhaust emission, and air-fuel ratio sensors 11 and 12 disposed upstream and downstream of the catalytic converter 10, respectively.

Also, an exhaust temperature sensor 13 is disposed near the air-fuel ratio sensor 11 of the upstream side. The sensor 13 detects an exhaust temperature at the inlet side of the catalytic converter 10. Further, in this example, a catalyst temperature sensor 31 is disposed at the center in the longitudinal direction of a monolithic ceramic catalyst support of the catalytic converter 10, and a catalyst outlet temperature sensor 32 is disposed at an outlet portion of the catalytic converter 10. The sensors 31 and 32 detect the temperature of the catalytic converter 10.

An ignition means such as an ignition plug 14 or the like is disposed at the center of the top of the combustion chamber 3. The ignition plug 14 ignites a mixture of fuel and air with a spark. A fuel-injection means such as a fuel-injection valve 15 is disposed at a lateral portion of the combustion chamber 3 near the suction path 4, for directly injecting fuel into the combustion chamber 3. Fuel having a predetermined pressure regulated by a high-pressure fuel pump 16 and a pressure regulator 17 is supplied to the fuel-injection valve 15 via a high-pressure fuel path 18. Accordingly, when the fuel-injection valve 15 of each cylinder is open due to a control pulse, an amount of fuel corresponding to the opening period of the valve and the regulated fuel pressure is injected. A fuel pressure sensor 19 detects the fuel pressure, and a low-pressure fuel pump 20 sends the fuel to the above-mentioned high-pressure fuel pump 16. In addition, the internal-combustion engine 1 includes a water temperature sensor 21 for detecting the temperature of cooling water for the engine, and a crank angle sensor 22 for detecting the crank angle. Also, an accelerator opening sensor 23 is provided for detecting the degree of depression of the accelerator pedal operated by a driver.

The amount of fuel injection, injection timing, ignition timing, and the like, of the internal-combustion engine 1 are controlled by a control unit 25. Detection signals of the above-described various sensors are input to the control unit 25. The control unit 25 determines the combustion mode, either homogeneous combustion or stratified combustion, in accordance with the operating condition of the engine detected with the input signals. Also, the control unit 25 controls the degree of opening of the electronically controlled throttle valve 7, the fuel-injection timing and the amount of fuel injection of the fuel-injection valve 15, the ignition timing of the ignition plug 14, and so forth, corresponding to the determination of the combustion mode. After completion of early warming-up for the catalytic converter 10, normal stratified combustion operation is performed in a low-speed and low-load region, and normal homogeneous combustion operation is performed in a high-speed and high-load region.

In the normal stratified combustion operation, the fuel is injected at a predetermined timing in the compression stroke, and is ignited at a timing before the compression top dead center. The fuel spray is concentrated in a layer near the ignition plug 14, resulting in ultralean stratified combustion with the air-fuel ratio ranging from about 30:1 to about 40:1. In the normal homogeneous combustion operation, the fuel is injected during the suction stroke, and is ignited at a timing near the point of minimum advance for best torque (MTB) before the compression top dead center. In this case, the fuel becomes a homogeneous mixture of fuel and air in the cylinder. The homogeneous combustion operation may be classified as homogeneous stoichiometric combustion with the theoretical air-fuel ratio, the homogeneous lean combustion with the lean air-fuel ratio ranging from about 20:1 to about 30:1.

At the cold start of the internal-combustion engine 1 that requires the early warming-up of the catalytic converter 10, super retard combustion is performed so that the exhaust temperature becomes elevated.

In the super retard combustion, the exhaust temperature is increased by retarding the fuel-injection timing and the ignition timing so as to be after the compression top dead center, for the purpose of afterburning of the combustion gas in the exhaust path. Considering the early warming-up of the catalytic converter 10, the larger the amount of retardation, the higher the exhaust temperature. However, the increase in the amounts of retardation of the fuel-injection timing and the ignition timing may decrease combustion stability. Thus, the amounts of retardation are set to satisfy the combustion stability.

When the fuel-injection timing and the ignition timing are retarded, combustion efficiency is decreased. Due to this, the torque decreases as compared with the case of the normal fuel-injection timing and the normal ignition timing. Therefore, the decrease in torque is corrected by increasing the amount of intake air and that of fuel injection.

The amount of intake air is increased with the control of the electronically controlled throttle valve 7. The amount of fuel injection is increased in accordance with the increase in the amount of intake air.

When the execution condition of the super retard combustion is established, the actual control is executed as follows.

First, the degree of opening of the throttle valve 7 is set so as to compensate for the decrease in torque in the case where the fuel-injection timing and the ignition timing are set to the retard limit satisfying the combustion stability. The degree of opening of the throttle valve 7 is set according to a map in which the engine speed and the load are plotted. When the fuel-injection timing and the ignition timing are set to the retard limit satisfying the combustion stability, the degree of opening allows the engine speed to be maintained at a target idle speed.

After the degree of opening of the throttle valve 7 is set as described above, the fuel-injection timing and the ignition timing are set to the retard limit satisfying the combustion stability, with consideration given to a delay in response of application of intake air at the time when the degree of opening of the throttle valve 7 is changed.

Figure 2:
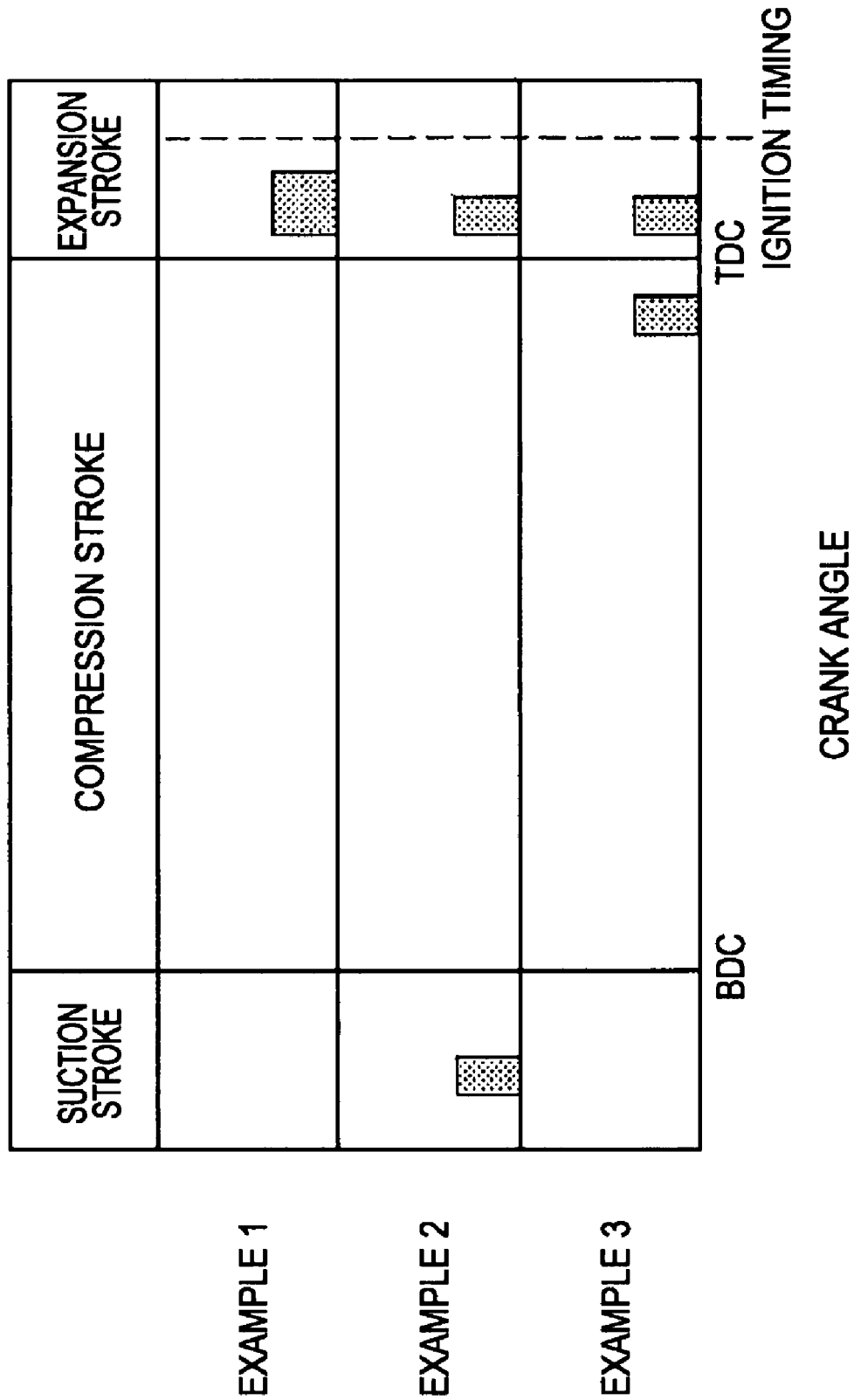
FIG. 2 is a characteristic diagram showing a fuel-injection timing and an ignition timing in super retard combustion.

The fuel-injection timing and the ignition timing in the super retard combustion are described with reference to FIG. 2. FIG. 2 shows three examples of the super retard combustion. In Example 1, the ignition timing is set to 15° to 30° after top dead center (ATDC, for example, 20° ATDC), and the fuel-injection timing (specifically, fuel-injection start timing) is set to a timing after the compression top dead center and before the ignition timing. At this time, the air-fuel ratio is set to the theoretical air-fuel ratio or slightly leaner (ranging from about 16:1 to 17:1).

In particular, to promote the warming-up of the catalyst and to decrease the amount of hydrocarbons (HCs) produced, the retardation of the ignition timing is effective, and in particular, the ignition timing after the top dead center (ATDC ignition) is appropriate. However, it is necessary to shorten the period of combustion to provide stable combustion with the ATDC ignition, and hence, it is necessary to promote flame propagation caused by turbulence. As described above, the turbulence generated in the suction stroke and the compression stroke is attenuated at the compression top dead center or later. In the presented exemplary approach, the high-pressure fuel injection during the expansion stroke at the compression top dead center or later causes gas fluidization, and this may generate and enhance turbulence in the cylinder. Accordingly, the flame propagation due to the ATDC ignition is promoted, providing the stable combustion.

Example 2, shown in FIG. 2, is an example in which the fuel injection occurs two times, namely, a first fuel injection is performed during the suction stroke, and a second fuel injection is performed at the compression top dead center or later. The ignition timing corresponds to the second fuel injection. So, the ignition timing becomes approximately 15° to 30° ATDC (for example, 20° ATDC), which is similar to the ignition timing of Example 1. The total amount of fuel injection in this case is equivalent to the amount of fuel injection in Example 1, and hence, the total air-fuel ratio becomes the theoretical air-fuel ratio or slightly leaner (ranging from about 16:1 to about 17:1) similarly to that of Example 1.

When the fuel injection is performed during the suction stroke (suction-stroke injection) prior to the fuel injection after the compression top dead center (expansion-stroke injection), the turbulence due to the fuel spray in the suction-stroke injection is attenuated in the latter-half of the compression stroke. Thus, the turbulence makes almost no contribution to the enhancement on the gas fluidization after the compression top dead center. However, since the injected fuel is diffused throughout the combustion chamber, the diffused fuel makes a contribution to the promotion of the afterburning of HCs due to the ATDC ignition. Accordingly, the suction-stroke injection is effective for reducing the amount of HCs produced and increasing the exhaust temperature.

Example 3, also shown in FIG. 2, is an example in which the fuel injection occurs two times, namely, a first fuel injection is performed during the compression stroke, and a second fuel injection is performed at the compression top dead center or later. When the fuel injection is performed during the compression stroke (compression-stroke injection) prior to the fuel injection after the compression top dead center (expansion-stroke injection), the attenuation in turbulence due to the fuel spray provided by the compression-stroke injection is delayed as compared with the case of the suction-stroke injection according to Example 2. Thus, the turbulence due to the first fuel injection remains, and by performing the second fuel injection at the compression top dead center or later, the turbulence can be increased so as to enhance the turbulence generated at the first fuel injection. Because of this, the gas fluidization can be further enhanced in the vicinity of the compression top dead center. In the case of Example 3, the first compression-stroke injection may be performed in the former half of the compression stroke, however, if it is performed in the latter half of the compression stroke (at 90° before top dead center, BTDC, or later), the turbulence in the vicinity of the top dead center may be further enhanced. In particular, if the first compression-stroke injection is set at 45° BTDC or later, more preferably, 20° BTDC or later, the gas fluidization at the compression top dead center or later may be further enhanced.

With the super retard combustion according to Examples 1 to 3, turbulence in the cylinder can be generated and enhanced due to the fuel spray applied immediately before the ignition, thus promoting the flame propagation. Accordingly, the decrease in combustion stability caused by the retardation of the ignition timing can be prevented, and hence, the combustion becomes stable. In particular, retarding the ignition timing such as to 15° to 30° ATDC can provide the reliable afterburning effect causing the early warming-up of the catalyst and a decrease in the amount of HCs produced. That is, even if the ignition timing is markedly retarded as described above, the combustion can be improved due to the enhancement of the flame propagation by retarding the fuel injection to the timing immediately before the ignition timing, and retarding the timing of the generation of turbulence.

At the normal idle speed control without the super retard combustion, the degree of opening of the throttle valve 7 is fed back for controlling the engine speed detected and calculated by the crank angle sensor 22 and the like to correspond to the target idle speed set on the basis of the degree of opening of an accelerator and the engine speed. For example, when the engine speed is smaller than the target idle speed, the engine speed is controlled to meet the target idle speed by correcting the degree of opening of the throttle valve 7 to the open side and increasing the amount of intake air. In this example, the normal idle speed control (ISC) without the super retard combustion is referred to as a first ISC control. On the other hand, in the idle speed control with the above-mentioned super retard combustion (hereinafter, referred to as a second ISC control), the exhaust temperature is controlled to be markedly higher as compared with that of the normal idle speed control. For example, when the engine speed is smaller than the target idle speed, if the degree of opening of the throttle valve 7 is corrected to the open side and the amount of intake air is increased, then the exhaust temperature, which is already increased for the early warming-up of the catalytic converter 10, is additionally increased. The catalytic converter 10 is rapidly heated with the heat of the high-temperature exhaust gas from the upstream side. This may cause thermal strain and an excessive increase in temperature of the catalytic converter 10.

Figure 3:
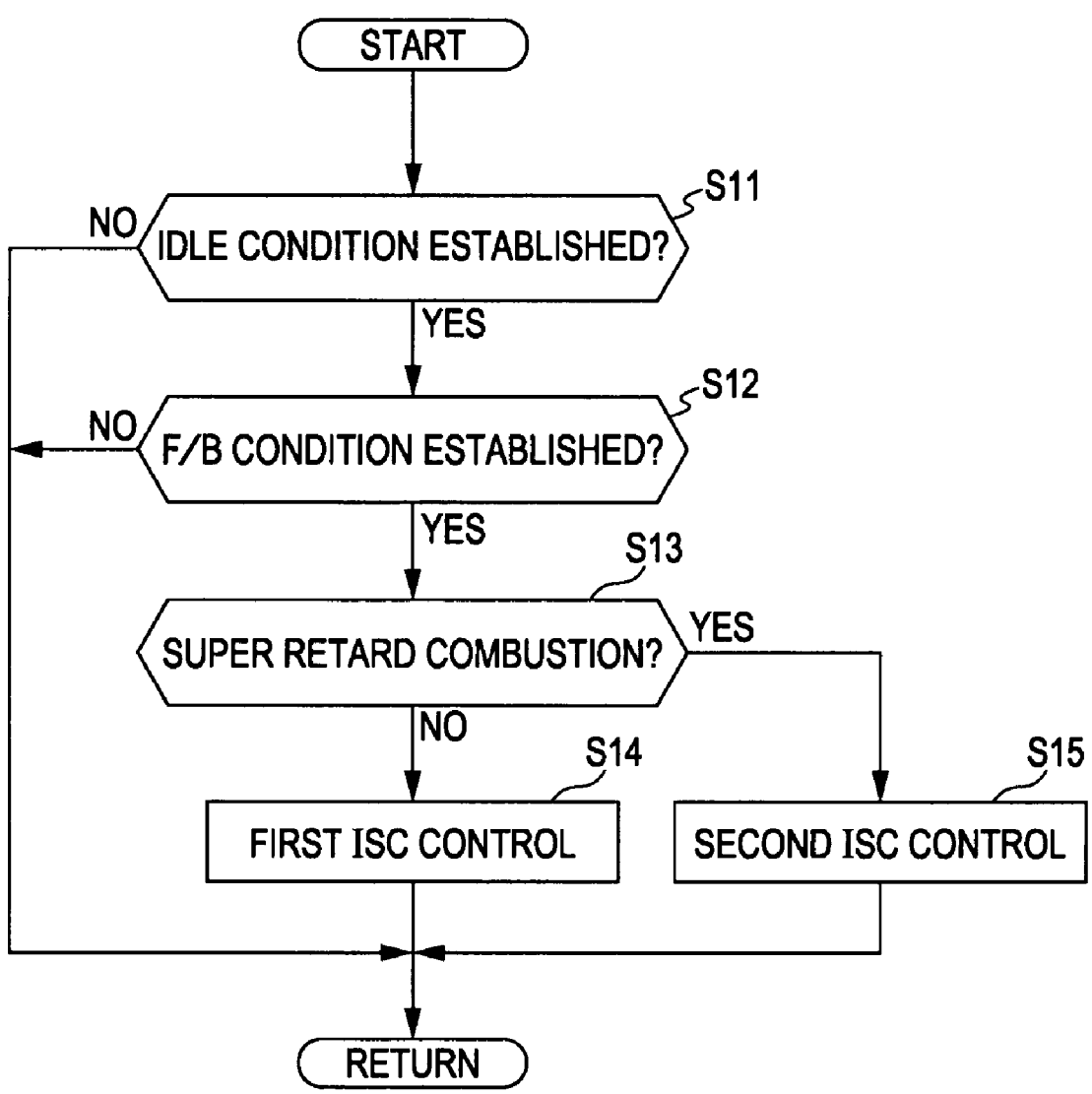
FIG. 3 is a flow chart showing switch processing of ISC control.

Accordingly, in accordance with this exemplary approach, the control method of the idle speed control is switched in accordance with the execution of the super retard combustion, based on the processing of a flow chart shown in FIG. 3.

FIG. 3 is a flow chart showing an exemplary operation of the system and repeated every predetermined period (e.g., every predetermined crank angle or every predetermined period of time), by way of the above-described control unit 25. In step S11, it is determined whether the execution condition of the idle speed control is established or not, shown as an idle condition being established. The execution condition of the idle speed control is established if an idle switch signal is turned ON and an accelerator pedal is not depressed. Note that the idle switch is turned ON, communicated as an idle switch signal, when the electronically controlled throttle valve 7 is almost completely closed. Alternatively, the execution condition for the idle speed control may be established, for instance, if the vehicle speed is substantially zero or the like.

The idle switch signal may not be a physical switch, and for instance, the signal may be generated by a detection signal of the accelerator opening sensor 23.

In step S12, it is determined whether the feedback control condition for correcting the engine speed to correspond to the target idle speed is established or not. The feedback condition includes whether the sensors and actuators utilized for the feedback control are in normal conditions, whether the difference between the target idle speed and the engine speed falls within a predetermined reference range, and the like.

When both idle condition and feedback condition are established, the procedure goes on to step S13 to determine whether the super retard combustion is performed or not. When the super retard combustion is not performed, the procedure goes on to step S14, and the fist ISC control is performed.

The first ISC control is described with reference to FIG. 4.

Figure 4:
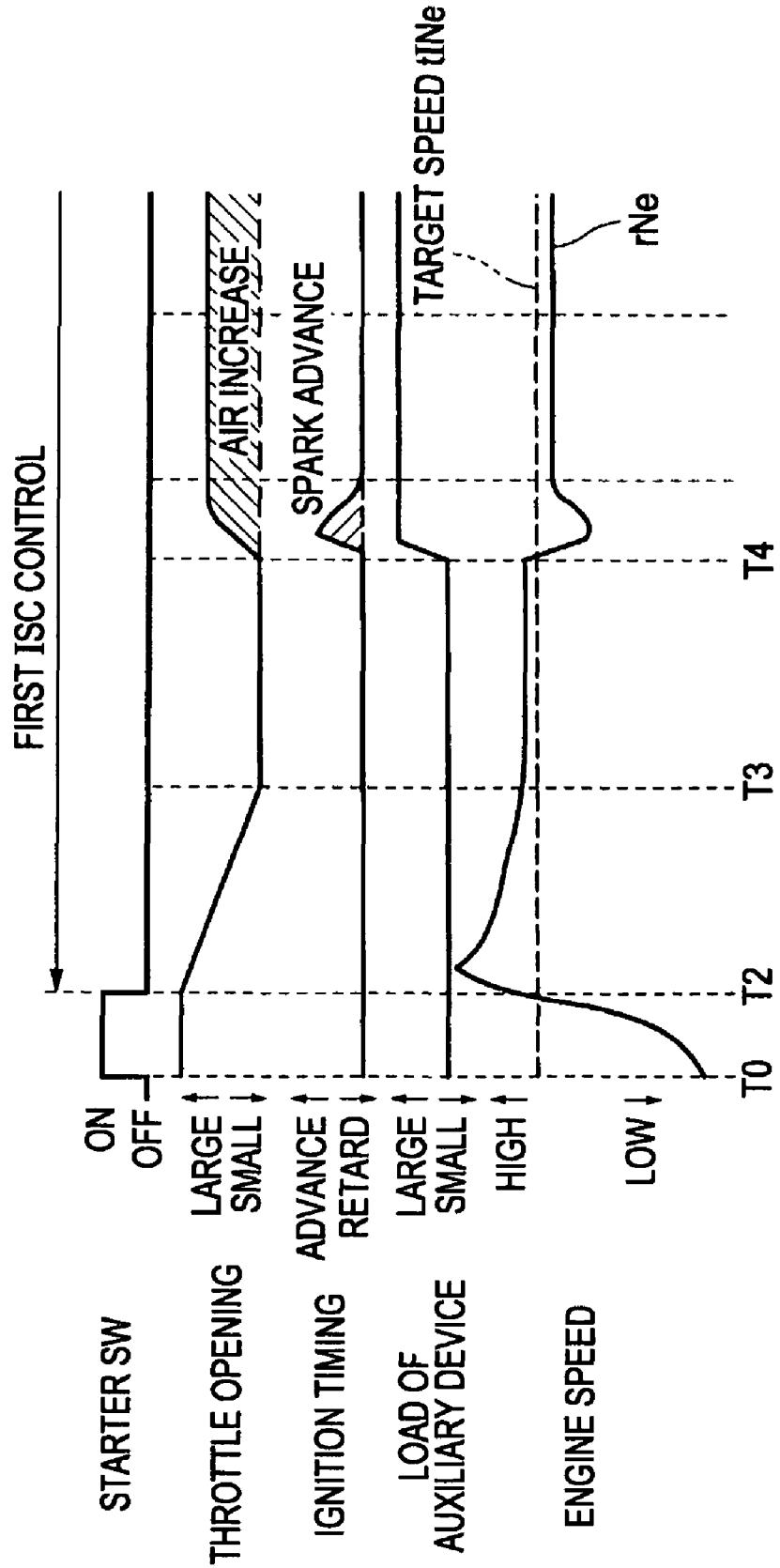
FIG. 4 is a time chart showing an example of a first ISC control at engine starting.

FIG. 4 shows a time chart showing the ignition timing from the engine starting and during the idle operation, and the control state of the degree of opening of the throttle valve 7.

When the starter switch is turned ON (T0), cranking is started by a starter and internal combustion occurs in the engine (T2). After the internal combustion initiates and during an engine speed rNe being in the overshoot state (T2 to T3), the degree of opening of the throttle valve 7 is gradually decreased so that the engine speed rNe is decreased to the target idle speed tINe. When the engine speed rNe reaches the target idle speed tINe (T3), the degree of opening of the throttle valve 7 and the ignition timing are fed back for controlling the engine speed rNe to correspond to the target idle speed tINe. For example, the feedback control is based on the known proportional-integral (PI) control. When the degree of opening of the throttle valve 7 is controlled to the open side, the amount of fuel injection is increased in accordance with the increase in the amount of intake air.

At a timing T4 where a predetermined period has elapsed after the engine starting, when a load of an auxiliary device such as an alternator is applied, the engine speed rNe is decreased. Then, in order to provide a feedback control such that the decreased engine speed rNe corresponds to the target idle speed tINe, the amount of intake air is increased by adjusting the degree of opening of the throttle valve 7 to the open side, and temporarily advancing the ignition timing to increase the torque.

As described above, in the first ISC control executed while the super retard combustion is not performed, the ignition timing, the degree of opening of the throttle valve 7, and the amount of fuel injection are controlled. Also, the feedback control is given to the engine speed to correspond to the target idle speed.

Now, the description again focuses on the flow chart shown in FIG. 3. In step S13, when it is necessary to activate the catalytic converter 10 immediately, for instance, at the cold start, namely, when the super retard combustion is performed, the procedure goes on to step S15, and the second ISC control, which is different from the first ISC control, is performed.

The second ISC control is described with reference to a time chart shown in FIG. 5. When the starter switch is turned ON (T0), cranking is started by the starter. Internal combustion initiates by way of an initial explosion performed due to a stratified combustion of a one-time compression-stroke injection. At a timing T1, the combustion mode is switched to the super retard combustion from the stratified combustion. Then, while the super retard combustion is performed, the second ISC control is executed.

Figure 5:
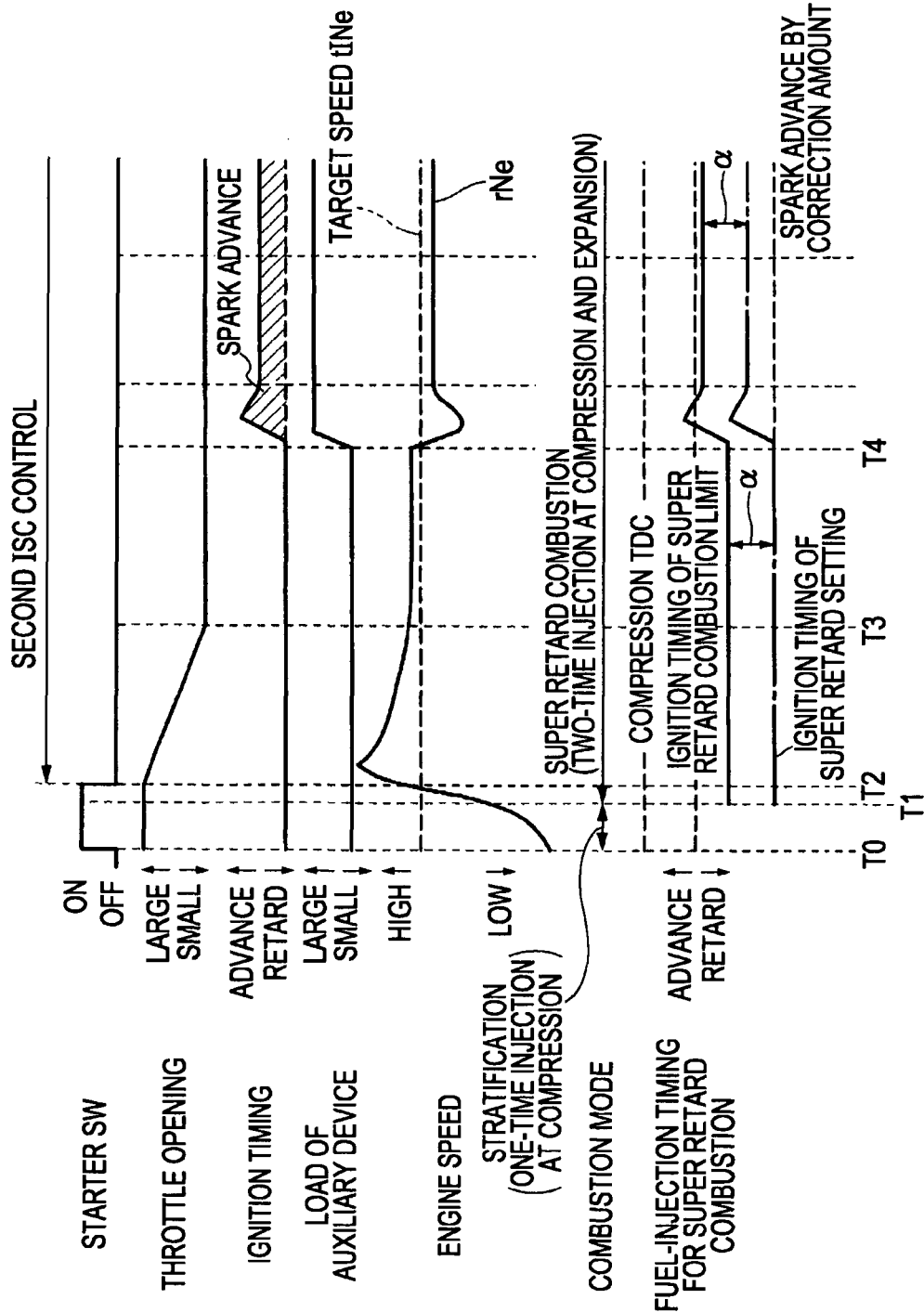
FIG. 5 is a time chart showing an example of a second ISC control at the engine starting.

In the second ISC control in this embodiment, as shown in the period between T2 and T3 in FIG. 5, the degree of opening of the throttle valve 7 is decreased from the degree set at the cranking, toward the degree that allows the engine speed rNe to be maintained at the target idle speed tINe in the super retard combustion. During this period, the amount of intake air is decreased in accordance with the decrease in the degree of opening of the throttle valve 7. The degree of opening of the throttle valve 7 at T3 or later is set on the basis of the map of the super retard combustion. The degree of opening of the throttle valve 7 at this time is set to compensate for the decrease in torque due to the super retard combustion. Thus, the degree of opening of the throttle valve 7 is set to a relatively large value as compared with the degree of opening of the throttle valve set in the first ISC control. When the engine speed rNe is smaller than the target speed tINe. e.g., after the load of the auxiliary device is applied (T4 or later), the degree of opening of the throttle valve 7 is inhibited from being adjusted to the open side to compensate the decrease in engine speed due to the input of the load of the auxiliary device.

As mentioned above, the degree of opening of the throttle valve 7 at the super retard combustion is set according to the map in which the engine speed and the load are plotted. When the fuel-injection timing and the ignition timing are set to the retard limit satisfying the combustion stability, the degree of opening allows the engine speed rNe to be maintained at the target idle speed tINe.

Unlike the first ISC control, the second ISC control inhibits the degree of opening of the throttle valve 7, which has been set as described above, from being corrected to the open side even if the engine speed rNe is decreased in accordance with the input of the load of the auxiliary device. Then, by advancing the ignition timing of the super retard setting, the engine speed rNe that is decreased due to the load of the auxiliary device is restored to the target idle speed tINe.

Since the fuel is injected immediately before the ignition timing for concentrating the rich mixture of fuel and air around the ignition plug in the super retard combustion, the fuel-injection timing is advanced in accordance with the advancement of the ignition timing. In particular, the fuel-injection timing is advanced (or retarded) synchronously with the advancement (or retardation) of the ignition timing, so as to keep a substantially uniform interval α between the fuel-injection timing and the ignition timing.

Figure 6:
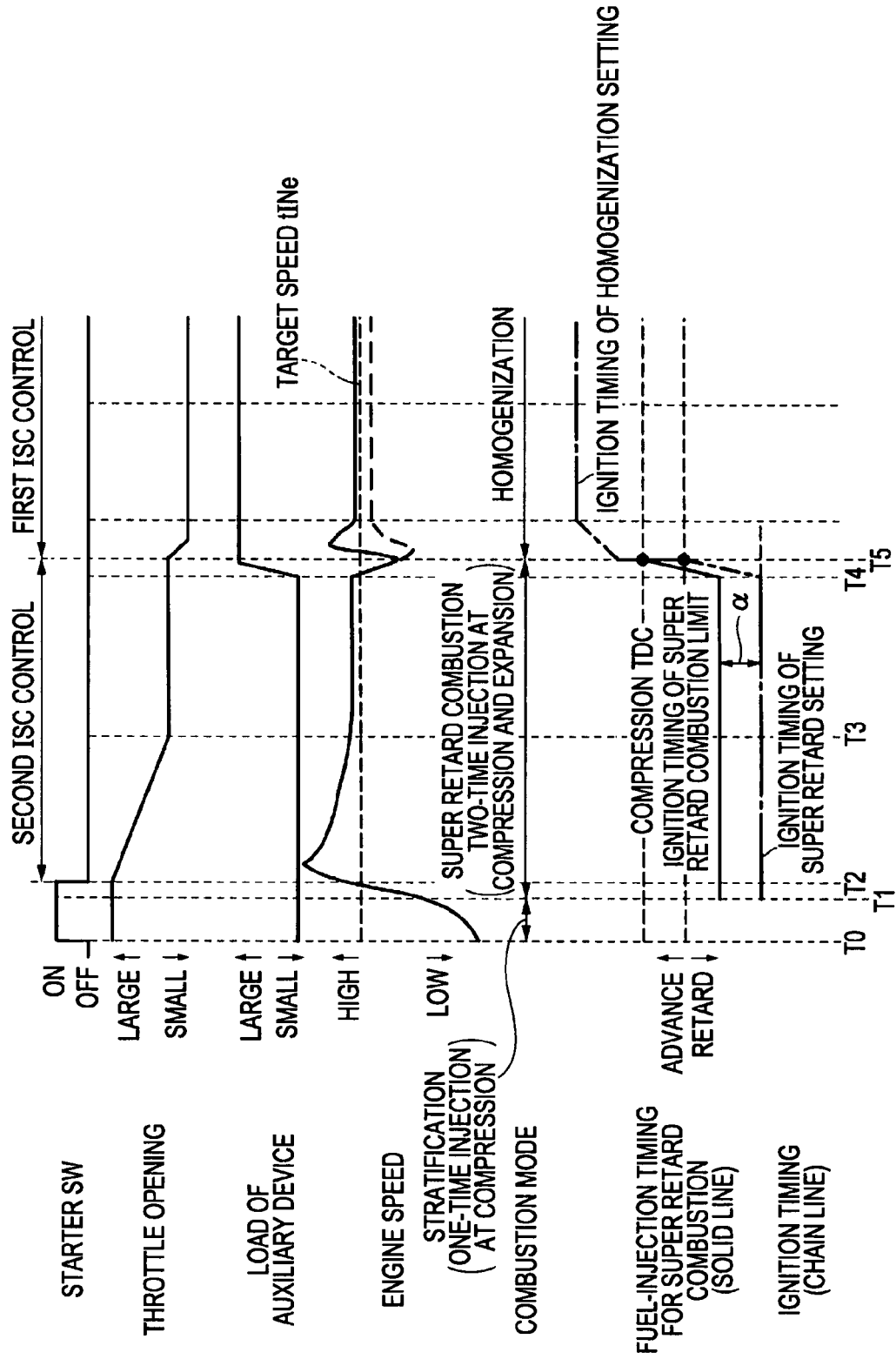
FIG. 6 is a time chart showing another example of the second ISC control at the engine starting.

FIG. 6 shows a state similar to the state of FIG. 5 in that the second ISC control is executed at the super retard combustion. However, the load of the auxiliary device in FIG. 6 is larger than that of FIG. 5. In this case, the decrease in the engine speed rNe due to the load of the auxiliary device is large, and hence the amount of advancement of the ignition timing to compensate the decrease in the engine speed rNe is also large. The super retard combustion is suspended or released at the time T5 when the ignition timing reaches a previously set value, or a limit value of the advance side for securing the stable super retard combustion. The combustion mode is switched from the super retard combustion to the homogeneous combustion in which the fuel is injected at the suction stroke, and the control condition is switched from the second ISC control to the first ICS control.

As described above, with the present embodiment, the super retard combustion is performed at the cold start of the internal-combustion engine because the early warming-up of the catalytic converter 10 is requested. Accordingly, early activation of the catalyst and a decrease in the amount of HCs produced by the afterburning can be provided. In addition, when the super retard combustion is not performed, the first ISC control is executed for the feedback control of the degree of opening of the throttle valve 7 and the ignition timing such that the engine speed rNe corresponds to the target idle speed tINe. Accordingly, the engine speed rNe can be accurately maintained at the target idle speed tINe.

In contrast, when the super retard combustion is performed, the exhaust temperature is set to be high for the early warming-up of the catalytic converter 10. The amount of retardation of the fuel-injection timing and ignition timing are set to be the limit retard amount satisfying the combustion stability. Note that the amount of retardation may be set in accordance with the combustion stability and/or the life time of the catalytic converter 10 suffering from thermal degradation.

During the super retard combustion, if the amount of intake air is increased in the case where the engine speed rNe is decreased due to the load of the auxiliary device applied thereto, then the amount of fuel injection is increased, resulting in an increase in heat quantity due to the combustion. As described above, since the catalytic converter 10 faces a thermally severe environment during the super retard combustion, if the heat quantity of the combustion is increased due to the load of the auxiliary device, the catalytic converter 10 may be thermally damaged, or deteriorated.

Therefore, in the present embodiment, the second ISC control is executed instead of the first ISC control in the case of the super retard combustion. In the second ISC control, the torque is increased by the advancement of the ignition timing and the corresponding advancement of the fuel-injection timing. As compared with the case of the first ISC control in which the amount of intake air is increased, the increase in heat quantity due to the combustion is suppressed and the torque can be increased in the second ISC control, thereby preventing the catalytic converter 10 from being excessively warmed up.

In the super retard combustion, the ignition timing has been markedly retarded relative to the point of minimum advance for best torque (MTB), providing an significant effect to enhance the torque owing to the advancement of the ignition timing as compared with the case of the normal combustion. Thus, the decrease in the engine speed can be immediately restored to the target idle speed according to the advancement of the ignition timing without the control of the degree of opening of the throttle valve 7.

In the super retard combustion, the ignition timing is markedly retarded, and hence, it is difficult to further retard the ignition timing, and the torque sensitivity is deteriorated due to the retardation of the ignition timing. In the second ISC control, in order to decrease the engine speed rNe to the target idle speed tINe, the amount of intake air is decreased in accordance with the degree of opening of the throttle valve 7 in the same manner as the first ISC control.

In order to increase the engine speed rNe to the target idle speed tINe, the ignition timing is advanced and the fuel-ignition timing is advanced without the increase in the amount of intake air. Accordingly, even during the super retard combustion, the thermal effect applied to the catalytic converter 10 is suppressed, and the control of the engine speed rNe to the target idle speed tINe can be performed with quick response.

While the present invention is described above on the basis of the specific embodiment, the present invention is not limited thereto, and may include various modifications and changes within the scope of the present invention.

For example, in the second ISC control, only the ignition timing and the fuel-injection timing may be controlled regardless of the increase or decrease in the engine speed rNe.

Also, in a hybrid car or the like using both engine and motor, the decrease in torque during the super retard combustion may be compensated with a torque generated by the motor.

What is claimed is:

1. A control device for a spark-ignited internal-combustion engine, the device comprising:
   a control unit that adjusts a degree of opening of a throttle valve, a fuel-injection of a fuel-injection valve, and an ignition timing of an ignition plug so as to control combustion of the internal-combustion engine, the throttle valve being provided at a suction path and regulating an amount of intake air applied to a combustion chamber;
   a first idle speed control that allows the degree of opening of the throttle valve and the ignition timing to be adjusted, and provides a feedback control such that an engine speed at least generally corresponds to a target speed;
   a catalyst warm-up unit that sets the ignition timing to be after a compression top dead center so as to increase an exhaust temperature in an operation mode that requires warming-up of a catalyst provided at an exhaust path for purification of exhaust gas; and
   a second idle speed control that inhibits the degree of opening of the throttle valve from being adjusted, advances the ignition timing, and provides the feedback control such that the engine speed at least generally corresponds to the target speed, when the catalyst warm-up unit has set the ignition timing to be after the compression top dead center.

2. The control device for the spark-ignited internal-combustion engine according to claim 1, wherein the control device is of an in-cylinder direct-injection type.

3. The control device for the spark-ignited internal-combustion engine according to claim 1, wherein the second idle speed control advances fuel-injection timing in accordance with the advancement of the ignition timing.

4. The control device for the spark-ignited internal-combustion engine according to claim 3, wherein the second idle speed control has a limit value for an amount of advancement of the ignition timing determined in accordance with combustion stability during the warming-up of the catalyst.

5. The control device for the spark-ignited internal-combustion engine according to claim 4, wherein when the amount of advancement of the ignition timing is above the limit value determined in accordance with the combustion stability, the second idle speed control inhibits the catalyst warm-up unit from increasing the exhaust temperature.

6. The control device for the spark-ignited internal-combustion engine according to claim 1, wherein the second idle speed control has a limit value for an amount of advancement of the ignition timing determined in accordance with combustion stability during the warming-up of the catalyst.

7. A spark-ignited internal-combustion engine comprising the control device for the spark-ignited internal-combustion engine according to claim 1.

8. A method for controlling a spark-ignited internal-combustion engine of in-cylinder direct-injection type, the method comprising:
  adjusting a degree of opening of a throttle and an ignition timing such that an engine speed at least generally corresponds to a target speed during an idle operation;
  determining whether warming-up of a catalyst provided at an exhaust path is requested;
  setting a fuel-injection timing and the ignition timing to be after a compression top dead center, thereby increasing an exhaust temperature when the warming-up of the catalyst is requested; and
  inhibiting the degree of opening of the throttle from adjusting and allowing only adjusting of the ignition timing so that an engine speed at least generally corresponds to a target speed, when the fuel-injection timing and the ignition timing are set to be after compression the top dead center.

9. The method for controlling the spark-ignited internal-combustion engine according to claim 8, the method further comprising setting the degree of opening of the throttle when the warming-up of the catalyst is requested to be relatively large as compared with a case where the degree of opening of the throttle and the ignition timing are adjusted and the engine speed at least generally corresponds to the target speed.

10. A control device for a spark-ignited internal-combustion engine, the device comprising:
  a controller means that adjusts a degree of opening of a throttle means, a fuel-injection of a fuel-injection means, and an ignition timing of an ignition means so as to -control combustion of the internal-combustion engine, the throttle means being provided at a suction path and regulating an amount of intake air applied to a combustion chamber;
  a first idle speed control means that allows the degree of opening of the throttle means and the ignition timing to be adjusted, and provides a feedback control such that an engine speed at least generally corresponds to a target speed;
  a catalyst warm-up means that sets the fuel-injection and the ignition timing to be after a compression top dead center so as to increase an exhaust temperature in an operation mode that requires warming-up of a catalyst provided at an exhaust path for purification of exhaust gas; and
  a second idle speed control means that inhibits the degree of opening of the throttle means from being adjusted, advances the ignition timing, and provides the feedback control such that the engine speed at least generally corresponds to the target speed, when the catalyst warm-up means has set the fuel-injection and the ignition timing to be after the compression top dead center.

11. The control device for the spark-ignited internal-combustion engine according to claim 10, wherein the controller means is of an in-cylinder direct-injection type.

12. The control device for the spark-ignited internal-combustion engine according to claim 10, wherein the second idle speed control means advances fuel-injection timing in accordance with the advancement of the ignition timing.

13. The control device for the spark-ignited internal-combustion engine according to claim 12, wherein the second idle speed control means has a limit value for an amount of advancement of the ignition timing determined in accordance with combustion stability during the warming-up of the catalyst.

14. The control device for the spark-ignited internal-combustion engine according to claim 13, wherein when the amount of advancement of the ignition timing is above the limit value determined in accordance with the combustion stability, the second idle speed control means inhibits the catalyst warm-up unit from increasing the exhaust temperature.

15. The control device for the spark-ignited internal-combustion engine according to claim 10, wherein the second idle speed control has a limit value for an amount of advancement of the ignition timing determined in accordance with combustion stability during the warming-up of the catalyst.

* * * * *